(12) United States Patent
Isokawa

(10) Patent No.: US 11,354,042 B2
(45) Date of Patent: Jun. 7, 2022

(54) MAGNETIC DISK DEVICE AND METHOD OF SETTING DATA FORMAT

(71) Applicants: Kabushiki Kaisha Toshiba, Tokyo (JP); Toshiba Electronic Devices & Storage Corporation, Tokyo (JP)

(72) Inventor: Hiroshi Isokawa, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/179,724

(22) Filed: Feb. 19, 2021

(65) Prior Publication Data
US 2022/0066649 A1 Mar. 3, 2022

(30) Foreign Application Priority Data
Aug. 27, 2020 (JP) .............................. JP2020-143291

(51) Int. Cl.
*G06F 3/06* (2006.01)
(52) U.S. Cl.
CPC .......... *G06F 3/0611* (2013.01); *G06F 3/0604* (2013.01); *G06F 3/0614* (2013.01); *G06F 3/0653* (2013.01); *G06F 3/0659* (2013.01); *G06F 3/0676* (2013.01)
(58) Field of Classification Search
CPC .... G06F 3/0611; G06F 3/0604; G06F 3/0614; G06F 3/0653; G06F 3/0659; G06F 3/0676; G11B 5/6005; G11B 5/6076; G11B 5/59633; G11B 5/54; G11B 5/58; G11B 5/584; G11B 5/488; G11B 5/5526; G11B 5/5534; G11B 5/012; G11B 5/02
See application file for complete search history.

(56) References Cited

U.S. PATENT DOCUMENTS

| 7,088,537 | B2 | 8/2006 | Cronch et al. |
| 7,515,371 | B1 | 4/2009 | Buch et al. |
| 8,873,188 | B2 * | 10/2014 | Livshitz ................. G11B 5/465 360/68 |
| 9,280,993 | B2 * | 3/2016 | Contreras .............. G11B 5/465 |
| 9,355,668 | B2 | 5/2016 | Nishida et al. |

OTHER PUBLICATIONS

I. Tagawa, M. Shiimoto, M. Matsubara, S. Nosaki, Y. Urakami and J. Aoyama, "Advantage of MAMR Read-Write Performance," in IEEE Transactions on Magnetics, vol. 52, No. 9, pp. 1-4, Sep. 2016, Art No. 3101104, doi: 10.1109/TMAG.2016.2569524. (Year: 2016).*

* cited by examiner

*Primary Examiner* — Khoa D Doan
(74) *Attorney, Agent, or Firm* — Allen & Overy LLP

(57) ABSTRACT

According to one embodiment, a magnetic disk device includes a disk, a head including a read head that reads data from the disk, a write head that writes data into the disk, and an assist element that generates energy for improving write performance of the write head, and a controller that adjusts a degauss condition after a stop of a write process of the write head, based on a resistance value of the assist element, and adjusts a data format of the disk in accordance with the degauss condition, the resistance value being measured after data is written into the disk, and the write process having an influence on the resistance value.

20 Claims, 7 Drawing Sheets

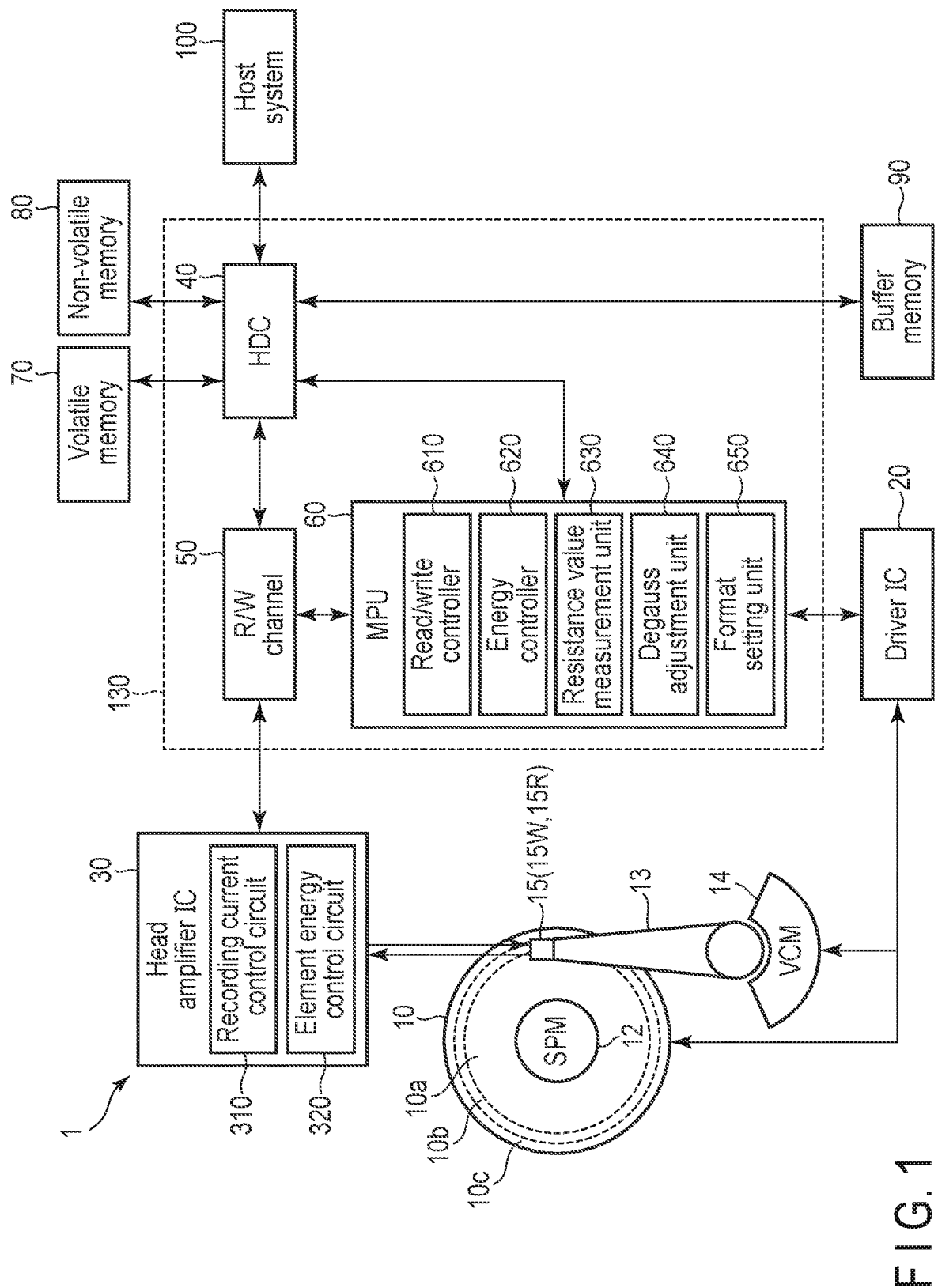
F I G. 1

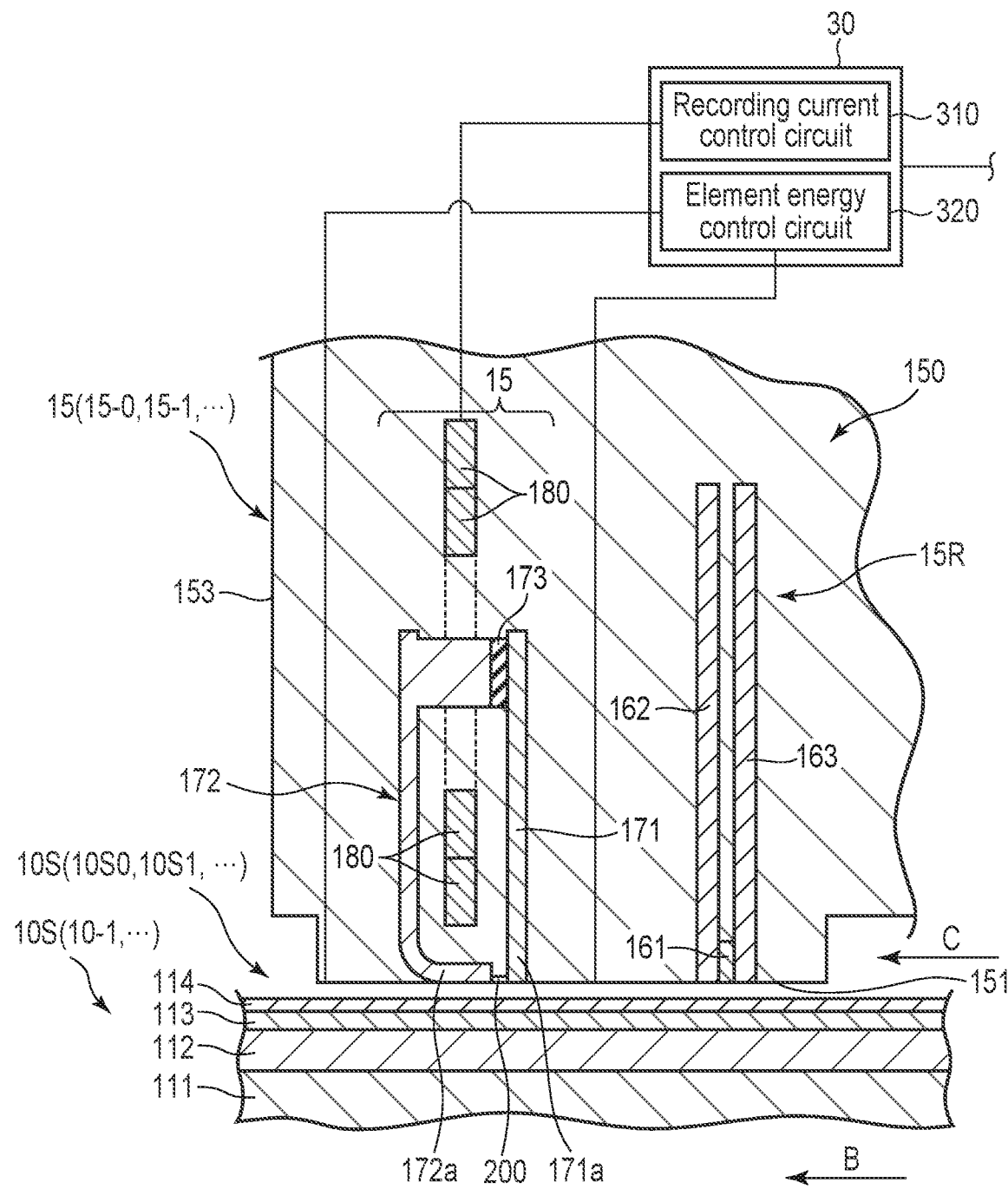
F I G. 3

MAGNETIC DISK DEVICE AND METHOD OF SETTING DATA FORMAT

CROSS-REFERENCE TO RELATED APPLICATIONS

This application is based upon and claims the benefit of priority from Japanese Patent Application No. 2020-143291, filed Aug. 27, 2020, the entire contents of which are incorporated herein by reference.

FIELD

Embodiments described herein relate generally to a magnetic disk device and a method of setting a data format.

BACKGROUND

In order to realize high recording density and high recording capacity of a magnetic disk device, a microwave assisted magnetic recording (MAMR) type, a thermally assisted magnetic recording (TAMR) type, and the like have been developed. The microwave assisted magnetic recording type is a technique in which a magnetic head including a recording magnetic pole (main magnetic pole) and a high-frequency oscillator is used to apply a high-frequency magnetic field to a disk, and thus the coercive force of a part of the disk to which the high-frequency magnetic field is applied is reduced. The recording magnetic pole is excited by applying a recording current to generate a recording magnetic field. The high-frequency magnetic field is generated by energizing the high-frequency oscillator. The thermally assisted magnetic recording type is a technique in which a magnetic head including a light irradiation element is used and the disk is locally heated by irradiating the disk with irradiation light from the tip of the light irradiation element, and thus the coercive force of a heated part of the disk is reduced. The light irradiation element irradiates the disk with the irradiation light.

In the magnetic disk device, when data write process is stopped before particular data, a recording current or recording voltage to be applied to a recording coil is gradually attenuated. Therefore, residual magnetization is generated in the head 15 by the recording current or recording voltage. In order not to erase the data by such residual magnetization, a region such as a gap is provided immediately before the data in the magnetic disk device. The formatting efficiency of the disk may decrease by providing such a gap.

BRIEF DESCRIPTION OF THE DRAWINGS

FIG. 1 is a block diagram illustrating a configuration of a magnetic disk device according to an embodiment.

FIG. 3 is an enlarged cross-sectional view illustrating an example of the disk and the head according to the embodiment.

DETAILED DESCRIPTION

Figure 2:
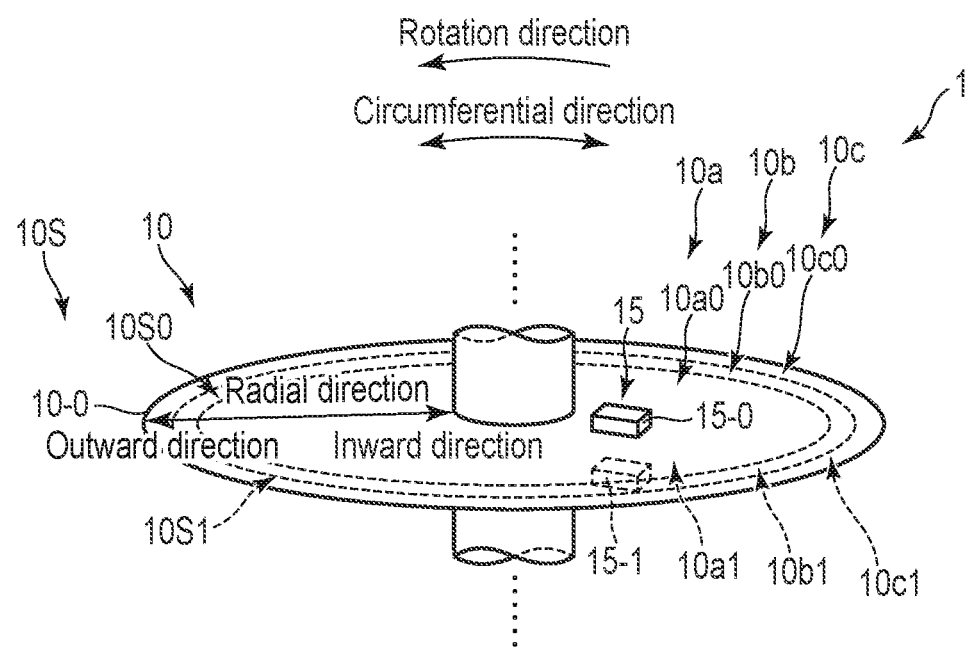
FIG. 2 is a schematic diagram illustrating an example of disposition of a head with respect to a disk according to the embodiment.

In general, according to one embodiment, a magnetic disk device comprises: a disk; a head including a read head that reads data from the disk, a write head that writes data into the disk, and an assist element that generates energy for improving write performance of the write head; and a controller that adjusts a degauss condition after a stop of a write process of the write head, based on a resistance value of the assist element, and adjusts a data format of the disk in accordance with the degauss condition, the resistance value being measured after data is written into the disk, and the write process having an influence on the resistance value.

Hereinafter, an embodiment will be described with reference to the drawings. The drawings are examples, and do not limit the scope of the invention.

EMBODIMENT

FIG. 1 is a block diagram illustrating a configuration of a magnetic disk device 1 according to an embodiment.

The magnetic disk device 1 includes a head disk assembly (HDA) described later, a driver IC 20, a head amplifier integrated circuit (hereinafter, head amplifier IC or preamplifier) 30, a volatile memory 70, a non-volatile memory 80, and a buffer memory (buffer) 90, and a system controller 130 being an integrated circuit of one chip. The magnetic disk device 1 is connected to a host system (simply referred to as a host below) 100.

The HDA includes a magnetic disk (referred to as a disk below) 10, a spindle motor (referred to as a SPM below) 12, an arm 13 on which a head 15 is mounted, and a voice coil motor (referred to as a VCM below) 14. The disk 10 is attached to the SPM 12 and is rotated by driving the SPM 12. The arm 13 and the VCM 14 form an actuator. The actuator controls the movement of the head 15 mounted on the arm 13 to a particular position on the disk 10 by driving the VCM 14. A plurality of disks 10 and a plurality of heads 15 are provided. Only a disk 10 and a head 15 may be provided.

In the disk 10, a user data region 10a which is available to the user, a media cache 10b (may also be referred to as a media cache region or a storage region), and a system region 10c are allocated as regions in which writing of data is possible. Data (or a command) transferred from the host and the like is temporarily stored or recorded in the media cache before being written into a particular region of the user data region 10a. Information required for system management is written into the system region. In one example, the storage region (for example, media cache 10b) corresponds to a cache region for resolving the discrepancy between a processing speed (at which data is processed in a particular part) or a transfer rate at which data is transferred from a particular region to the disk 10, and a write rate at which data is written into the disk 10. The storage region may include the system region 10c. The region of the disk 10 other than the media cache 10b and the system region 10c for temporarily storing or recording data may be used as the storage region. The system region 10c may include the storage region. A direction from the inner circumference to the outer circumference of the disk 10 or a direction from the outer circumference to the inner circumference of the disk 10 is referred to as a radial direction below. In the radial direction, the direction from the inner circumference to the outer circumference is referred to as an outer direction (outside), and the direction from the outer circumference to the inner circumference is referred to as the inner direction (inside). A direction orthogonal to the radial direction of the disk 10 is referred to as a circumferential direction. The circumferential direction corresponds to a direction along the circumference of the disk 10. A particular position in the radial direction of the disk 10 may be referred to as a radial position. A particular position in the circumferential direction of the disk 10 may be referred to as a circumferential position. The radial position and the circumferential position may be collectively and simply referred to as a position. A "track" means one of a plurality of regions obtained by division in the radial direction of the disk 10, a path of the head 15 at a particular radial position, data extending in the circumferential direction of the disk 10, and data for one lap, which is written on a track at a particular radial position, and data written on the track. In addition, the "track" is used with various meanings. A "sector" means one of a plurality of regions in which a track is divided in the circumferential direction, data written at a particular position on the disk 10, and data written on a sector. In addition, the "sector" is used with various meanings. The "width of a track in the radial direction" may also be referred to as a "track width". The "path passing through the center position of a track width in a particular track" is referred to as a "track center".

The head 15 faces the disk 10. For example, a head 15 faces a surface of the disk 10. The head 15 includes a slider as a main body, and includes a write head 15W and a read head 15R mounted on the slider. The write head 15W writes data into the disk 10. The read head 15R reads data written on the disk 10. In addition, the "write head 15W" may be simply referred to as the "head 15". The "read head 15R" may be simply referred to as the "head 15". In addition, the "write head 15W and read head 15R" may be collectively referred to as the "head 15". The "center of the head 15" may be referred to as the "head 15". The "center of the write head 15W" may be referred to as the "write head 15W". In addition, the "center of the read head 15R" may be referred to as the "read head 15R". The "center of the write head 15W" may be simply referred to as the "head 15", and the "center of the read head 15R" may be simply referred to as the "head 15". "Positioning the center of the head 15 on the track center of a particular track" may mean "positioning the head 15 on a particular track", "disposing the head 15 on a particular track", or "locating the head 15 on a particular track".

FIG. 2 is a schematic diagram illustrating an example of disposition of the head 15 with respect to the disk 10 according to the present embodiment. As illustrated in FIG. 2, a direction in which the disk 10 rotates in the circumferential direction is referred to as a rotation direction. In the example illustrated in FIG. 2, the rotation direction indicates being counterclockwise, but may indicates the opposite direction (clockwise).

In the example illustrated in FIG. 2, the disk 10 includes a disk 10-0 and the like. The disk 10 has surfaces 10S (10S0, 10S1, and the like). The disk 10-0 has a front surface 10S0 and a back surface 10S1 on the opposite side of the front surface 10S0. The surface 10S0 has a user data region 10a0, a media cache 10b0, and a system region 10c0. The back surface 10S1 has a user data region 10a1, a media cache 10b1, and a system region 10c1.

In the example illustrated in FIG. 2, the head 15 includes a head 15-0, a head 15-1, and the like. The head 15 faces the surface 10S. The head 15-0 faces the surface 10S0. The head 15-0 writes data onto the surface 10S0 and reads data from the surface 10S0. The head 15-1 faces the back surface 10S1. The head 15-1 writes data to the back surface 10S1 and reads data from the back surface 10S1. Three or more heads 15 and three or more disks 10 may be provided.

FIG. 3 is an enlarged cross-sectional view illustrating an example of the disk 10 and the head 15 according to the embodiment. In FIG. 3, a rotation direction B of the disk 10 (10-0 and the like) coincides with a direction of an air flow C. A direction from the head 15 (15-0, 15-1, and the like) toward the disk 10 is referred below to as a downward direction, or simply as being downward. A direction from the disk 10 toward the head 15 is referred below to as an upward direction or simply as being upward. When expressions such as "another layer on a particular layer" and "another layer under a particular layer" are used, the another layer may be in contact with the particular layer or may be located to be spaced from the particular layer.

In the example illustrated in FIG. 3, in the disk 10, a substrate 111, a soft magnetic layer 112, a magnetic recording layer 113, and a protective film layer 114 are stacked in this order. The substrate 111 is formed of a disk-shaped nonmagnetic material. The soft magnetic layer 112 is located on the substrate 111. The soft magnetic layer 112 is formed of a material exhibiting soft magnetic properties. The magnetic recording layer 113 is located on the soft magnetic layer 112. The magnetic recording layer 113 has magnetic anisotropy in a direction perpendicular to the front surface of the disk 10 (front surface of the magnetic recording layer 113 or the front surface of the protective film layer 114). The protective film layer 114 is located on the magnetic recording layer 113.

In the example illustrated in FIG. 3, the head 15 includes a slider 150. The slider 150 is formed of, for example, a sintered body (artic) of alumina and titanium carbide. The slider 150 has a front surface of the disk 10, for example, a disk facing surface (air bearing surface (ABS)) 151 that faces the protective film layer 114, and a trailing end 153 located on the outflow side of the air flow C. A part of the read head 15R and the write head 15W is exposed on the disk facing surface 151.

The read head 15R includes a magnetic film 161, a shield film 162, and a shield film 163. The magnetic film 161 is located between the shield film 162 and the shield film 163 and produces a magnetoresistive effect. The shield film 162 is located on the trailing end 153 side with respect to the magnetic film 161. The shield film 163 faces the shield film 162. The lower ends of the magnetic film 161, the shield film 162, and the shield film 163 are exposed on the disk facing surface 151.

The write head 15W is provided on the trailing end 153 side of the slider 150 with respect to the read head 15R. The write head 15W is comprised of a main magnetic pole 171, a trailing shield (write shield) 172, an insulator 173, a recording coil 180, and a magnetic flux control unit (assist element), for example, a spin torque oscillator (STO) 200. The recording coil 180 is disposed to be wound around a magnetic circuit including the main pole 171 and the write shield 172 in order to allow magnetic flux to flow through the main pole 171.

The main magnetic pole 171 is formed of a soft magnetic material having high saturation magnetic flux density. The main magnetic pole 171 generates a recording magnetic field in the direction perpendicular to the front surface of the disk 10 in order to magnetize the magnetic recording layer 113 of the disk 10. In the example illustrated in FIG. 3, the main magnetic pole 171 extends substantially perpendicular to the disk facing surface 151. The lower surface of a tip portion 171a of the main magnetic pole 171 on the disk facing surface 151 side is exposed on the disk facing surface 151. The tip portion 171a of the main magnetic pole 171 is tapered toward the disk facing surface 151 and is formed in a columnar shape having a width narrower than the other portions. The width of the tip portion 171a of the main magnetic pole 171 in a cross-track direction substantially corresponds to the track width of a particular track. The cross-track direction is, for example, a direction along the radial direction.

The write shield 172 is formed of a soft magnetic material having high saturation magnetic flux density. The write shield 172 is provided to efficiently close a magnetic path via the soft magnetic layer 112 directly below the main magnetic pole 171. The write shield 172 is located on the trailing end 153 side with respect to the main magnetic pole 171. The write shield 172 is joined to the main magnetic pole 171 via the insulator 173. The main magnetic pole 171 and the write shield 172 are electrically insulated from each other and form the magnetic circuit. The write shield 172 is formed in a substantially L shape, and has a tip portion 172a facing the disk facing surface 151 with a write gap at the tip portion 171a of the main magnetic pole 171. The lower surface of the tip portion 172a is exposed on the disk facing surface 151 of the slider 150.

The recording coil 180 is provided to wind around the magnetic circuit including the main magnetic pole 171 and the write shield 172 in order to allow magnetic flux to flow through the main magnetic pole 171. The recording coil 180 is provided, for example, between the main magnetic pole 171 and the write shield 172. When a current (referred to as a write current or a recording current) of a particular magnitude is supplied to the recording coil 180, a recording magnetic field is excited in the main magnetic pole 171 and the write shield 172. Therefore, the main magnetic pole 171 and the write shield 172 are magnetized. The magnetization direction of a recording bit of the magnetic recording layer 113 in the disk 10 is changed by the magnetic flux flowing through the magnetized main magnetic pole 171 and write shield 172. With the change of the magnetization direction, a magnetization pattern corresponding to the recording current is recorded on the disk 10.

The assist element, for example, the spin torque oscillator (STO) 200, is provided between the tip portion 171a of the main magnetic pole 171 and the tip portion 172a of the write shield 172. In other words, the spin torque oscillator 200 is provided in the write gap. For example, the STO 200 has a structure in which an underlayer formed by a nonmagnetic conductive layer, a spin injection layer, an intermediate layer, an oscillation layer, and a gap layer formed by a nonmagnetic conductive layer are sequentially stacked from the tip portion 171a side of the main magnetic pole 171 to the tip portion 172a side of the write shield 172.

The assist element, for example, the STO 200, generates energy for improving the write performance of the write head 15W into the disk 10, on the surface 10S (10S0, 10S1, and the like) of the disk 10. The STO 200 generates a high-frequency (microwave) magnetic field in a manner as follows. That is, for example, particular energy (may be referred to as element energy), for example, a particular current (referred to as a bias current, a drive current, or an assist current) or a particular voltage (referred to as a bias voltage, a drive voltage, or an assist voltage) is applied to generate a gap magnetic field in the write gap. With the gap magnetic field, the magnetization rotates uniformly (spin precession motion), and thus the high-frequency magnetic field having a frequency which is sufficiently higher than the frequency of a recording signal is generated toward the disk 10. The STO 200 reduces the coercive force of the magnetic recording layer 113 by applying a high-frequency magnetic field to the magnetic recording layer 113 of the disk 10. When the spin precession motion is largely generated in the spin torque oscillator 200, the magnetic permeability of the STO 200 becomes as low as the magnetic permeability of an air. Therefore, the magnetic flux from the main magnetic pole 171 is more likely to flow toward the disk 10 than the write gap (STO 200). When the spin precession motion is not generated in the STO 200 or is generated smaller than usual, the magnetic permeability of the spin torque oscillator 200 becomes higher than the magnetic permeability of the air. Therefore, the magnetic flux from the main magnetic pole 171 is more likely to flow toward the write gap (STO 200) than the disk 10. A write process of supplying element energy, for example, a drive current (or may also be referred to as an assist current) or a drive voltage (or may also be referred to as an assist voltage) to the assist element, for example, the STO 200, to write data may also be referred below to as assist recording or high frequency assisted recording. The effect of assisting the write process into the disk 10 may be referred below to as an assist effect. "Assisted recording" may be simply referred to as "writing".

The driver IC 20 controls driving of the SPM 12 and the VCM 14 under control of the system controller 130 (specifically, MPU 60 described later).

The head amplifier IC (preamplifier) 30 includes a read amplifier and a write driver (either not illustrated), for example, a recording current control circuit 310, an element energy control circuit 320, and the like. The read amplifier amplifies a read signal read from the disk 10 and outputs the amplified signal to the system controller 130 (specifically, read/write (R/W) channel 50 described later). The recording current control circuit 310 is electrically connected to the recording coil 180 to supply the recording current corresponding to write data output from the R/W channel 50, to the recording coil 180. Data written into the disk 10 may be referred below to as write data, and data read from the disk 10 may be referred below to as read data. For example, the recording current control circuit 310 supplies the recording current to the recording coil 180 under the control of the system controller 130 (MPU 60). The element energy control circuit 320 is electrically connected to the assist element, for example, the spin torque oscillator 200. The element energy control circuit 320 applies particular element energy, for example, a particular assist current or a particular assist voltage to the spin torque oscillator 200 under the control of the system controller 130, for example, the MPU 60. The element energy control circuit 320 measures the resistance value (may also be referred below to as an assist-element resistance value) of the assist element, for example, the spin torque oscillator 200.

The volatile memory 70 is a semiconductor memory in which stored data is lost when the power is not supplied. The volatile memory 70 stores data and the like required for processing in each unit of the magnetic disk device 1. The volatile memory 70 is, for example, a dynamic random access memory (DRAM) or a synchronous dynamic random access memory (SDRAM).

The non-volatile memory 80 is a semiconductor memory that records the stored data even though the power is not supplied. The non-volatile memory 80 is, for example, a NOR type or NAND type flash ROM (Flash Read Only Memory: FROM).

The buffer memory 90 is a semiconductor memory that temporarily records data and the like which are transmitted and received between the magnetic disk device 1 and a host 100. The buffer memory 90 may be integrally configured with the volatile memory 70. The buffer memory 90 is, for example, a DRAM, a static random access memory (SRAM), an SDRAM, a ferroelectric random access memory (FeRAM), a magnetoresistive random access memory (MRAM), or the like.

The system controller (controller) 130 is realized, for example, by using a large-scale integrated circuit (LSI) referred to as a system-on-a-Chip (SoC) in which a plurality of elements are integrated on a single chip. The system controller 130 includes a hard disk controller (HDC) 40, the read/write (R/W) channel 50, and the microprocessor (MPU) 60. The HDC 40, the R/W channel 50, and the MPU 60 are electrically connected to each other. The system controller 130 is electrically connected to, for example, the driver IC 20, the head amplifier IC 60, the volatile memory 70, the non-volatile memory 80, the buffer memory 90, the host system 100, and the like.

The HDC 40 controls data transfer between the host 100 and the R/W channel 50 in response to an instruction from the MPU 60 described later. The HDC 40 is electrically connected to, for example, the volatile memory 70, the non-volatile memory 80, the buffer memory 90, and the like.

The R/W channel 50 executes signal processing of read data and write data in response to an instruction from the MPU 60. The R/W channel 50 is electrically connected to, for example, the head amplifier IC 30 or the like. The R/W channel 50 has a circuit or a function of modulating write data. The R/W channel 50 has a circuit or a function of measuring the signal quality of the read data.

The MPU 60 is a main controller that controls each unit in the magnetic disk device 1. The MPU 60 controls the VCM 14 via the driver IC 20 and performs positioning of the head 15. The MPU 60 controls a write operation of data into the disk 10 and selects the storing destination of write data transferred from the host 100. The MPU 60 controls read operation of data from the disk 10 and controls processing of read data transferred from the disk 10 to the host 100. The MPU 60 is connected to each unit of the magnetic disk device 1. The MPU 60 is electrically connected to, for example, the driver IC 20, the HDC 40, the R/W channel 50, and the like.

The MPU 60 includes a read/write controller 610, an energy controller 620, a resistance value measurement unit 630, a degauss adjustment unit 640, and a format setting unit 650. The MPU 60 executes processing of each unit, for example, the read/write controller 610, the energy controller 620, the resistance value measurement unit 630, the degauss adjustment unit 640, the format setting unit 650, or the like, on the firmware. The MPU 60 may include each unit, for example, the read/write controller 610, the energy controller 620, the resistance value measurement unit 630, the degauss adjustment unit 640, the format setting unit 650, and the like as a circuit.

The read/write controller 610 controls a write process and read process of data in response to a command or the like from the host 100 or the like. When the read/write controller 610 receives a command from the host 100 or the like, the read/write controller executes the write process of writing data into a particular region. When the read/write controller 610 receives a command from the host 100 or the like, the read/write controller executes the read process of reading data from a particular region. The read/write controller 610 controls the VCM 14 via the driver IC 20, performs positioning of the head 15 at a target position on the disk 10, and executes the write process or the read process. For example, the read/write controller 610 supplies a recording current to the recording coil 180 to excite a recording magnetic field in the main magnetic pole 171 and the write shield 172. Then, the read/write controller 610 supplies element energy, for example, the assist current or the assist voltage to the assist element, for example, the STO 200, to generate a high-frequency magnetic field. Thus, data is written (assisted recording) into a particular region of the disk 10. The read/write controller 610 may supply the recording current to the recording coil 180 to excite the recording time to the main magnetic pole 171 and the write shield 172. Then, the read/write controller may not supply the element energy, for example, the assist current or the assist voltage to the assist element, for example, the STO 200. Thus, data may be written into a particular region of the disk 10 without the assist effect. For example, the read/write controller 610 temporarily stops the write process of data into a particular region of a particular track, for example, into a region immediately before servo data (or tip portion of the servo data), to read the servo data. Then, the read/write controller 610 starts the write process of data from a region immediately after the servo data (or rear end portion on an opposite side of the tip portion of the servo data) again to write data. The read/write controller 610 temporarily stops the write process of data into a region immediately before a particular region of a particular track (or tip portion of this region) and executes degauss until the read process of the servo data is started. The degauss (may also be referred below to as a degauss operation or a degauss process) means, for example, processing of gradually attenuating the recording current (or recording voltage) to be supplied to the recording coil 180 from the recording current control circuit 310 of the head amplifier IC 30 when the write process is stopped, and gradually eliminating the residual magnetization generated in the write head 15W (main magnetic pole 171 and write shield 172) in accordance with the shape of the head 15. A period until the recording current (or recording voltage) reaches a particular value, for example, 0 after the write process is stopped, or until the magnetization generated in the main magnetic pole 171 and the write shield 172, for example, the residual magnetization disappears after the write process is stopped may also be referred to as a degauss duration. The frequency of the recording current (or recording voltage) during the degauss duration may be referred to as a degauss frequency. In the degauss operation in accordance with a degauss condition including the set degauss duration and degauss frequency, the read/write controller 610 may write not-desired data or meaningless data into a region (may be referred to as a degauss region below) adjacent to a region immediately before servo data, for example, into Gap (may be referred to as a previous Gap below) adjacent to the region immediately before the servo data. Such writing of not-desired data or meaningless data is caused by the residual magnetization generated in the head 15 (write head 15W) during a period from when the write process of data is stopped in a particular region, for example, in a region immediately before the servo data until the read process of the servo data is started. Here, "being adjacent" includes not only a case where data, an object, a region, a space, and the like are arranged in contact with each other, but also a case where data, an object, a region, a space, and the like are arranged at a particular interval.

Figure 4:
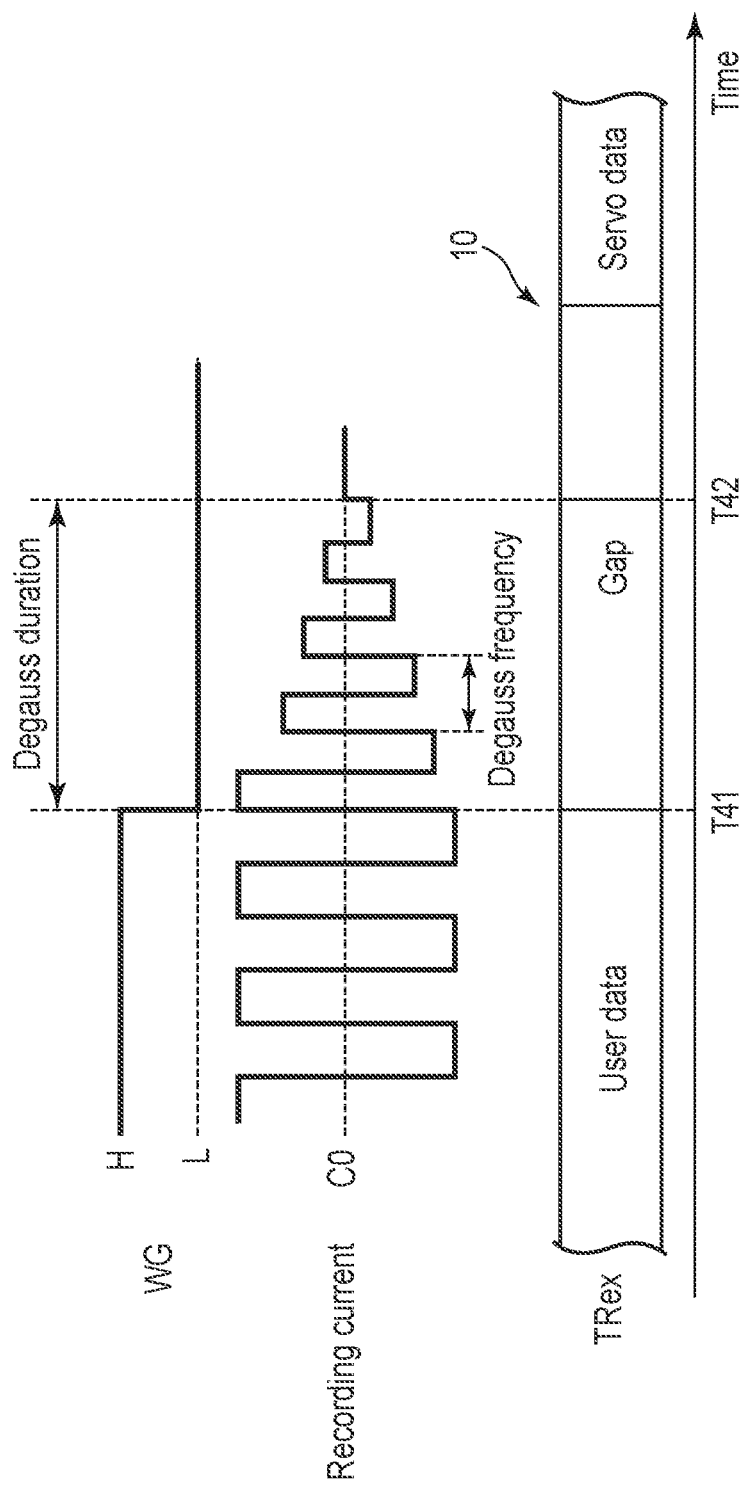
FIG. 4 is a schematic diagram illustrating an example of a degauss operation.

FIG. 4 is a schematic diagram illustrating an example of the degauss operation. In FIG. 4, a horizontal axis indicates time. On the horizontal axis in FIG. 4, the time elapses as directing toward the tip of an arrow. Timings T41 and T42 are shown on the horizontal axis in FIG. 4. A timing T42 corresponds to a timing after a timing T41. FIG. 4 illustrates a write gate WG, the recording current, and a track TRex. In the write gate WG of FIG. 4, a signal level L indicates that the write gate is in the negate (inactive, disabled, or OFF) state. A signal level H indicates that the write gate is asserted (active, enabled, or ON) state. The write gate WG has the signal level L from the signal level H to at the timing T41. The recording current in FIG. 4 indicates a current value C0. The current value C0 is a constant value, for example, 0. In FIG. 4, the track TRex has user data (may be referred to as previous user data below) located before the servo data, a previous Gap (gap), and servo data. In the track TRex of FIG. 4, the previous user data, the previous Gap (gap), and the servo data are arranged in the order described. In other words, the previous Gap is disposed between the previous user data and the servo data.

In the example illustrated in FIG. 4, the read/write controller 610 negates the write gate WG at the circumferential position in the previous Gap, which corresponds to the timing T41, so as to stop the write process. In the degauss operation in accordance with the set degauss duration and the set degauss frequency, the read/write controller 610 may write data corresponding to the residual magnetization of the head 15 based on the recording current having the degauss frequency in a range of the previous Gap from the circumferential position in the previous Gap, which corresponds to the timing T41 to the circumferential position in the previous Gap, which corresponds to the timing T42.

The energy controller 620 controls (or adjusts) the energy to be supplied to the head 15. The energy controller 620 controls (or adjusts) the recording current to be supplied (or applied) to the recording coil 180 and the element energy to be supplied (or applied) to the assist element. For example, the energy controller 620 controls (or adjusts) the element energy, for example, the assist current or the assist voltage to be supplied (or applied) to the assist element, for example, the STO 200.

The resistance value measurement unit 630 measures the resistance value of each unit of the head 15. The resistance value measurement unit 630 measures the assist-element resistance value of the assist element, for example, the STO 200. For example, the resistance value measurement unit 630 measures the assist-element resistance value of the assist element, for example, the STO 200, via the element energy control circuit 320 of the head amplifier IC 30. The resistance value measurement unit 630 measures the assist-element resistance value of the assist element, for example, the STO 200, after data is written into a particular region of the disk 10 and then the write process is stopped. "After data is written into a particular region of the disk 10 and then the write process is stopped" may be simply referred to as "after writing" or "after write". The assist-element resistance value may change, for example, depending on the magnetization state of the write head 15W (main magnetic pole 171 and write shield 172). In other words, the assist-element resistance value may be affected by the degauss operation in accordance with the degauss condition. That is, the assist element and the degauss condition may influence each other. For example, since the assist-element resistance value is measured after data is written into a particular region, it is possible to check the magnetization (for example, residual magnetization) state between the main magnetic pole 171 and the write shield 172 after writing. In other words, it is possible to check the influence of the degauss condition by measuring the assist-element resistance value after the data is written into the particular region. That is, it is possible to estimate whether or not the degauss condition is the optimum, by measuring the assist-element resistance value after write.

The degauss adjustment unit 640 adjusts (changes or sets) the degauss condition such as the degauss duration and the degauss frequency corresponding to the head 15. The degauss adjustment unit 640 adjusts the degauss condition corresponding to the head 15, in accordance with the assist-element resistance value corresponding to the head 15. The degauss adjustment unit 640 adjusts the degauss condition corresponding to the head 15 so that fluctuation in the assist-element resistance value is small when measurement of the assist-element resistance value corresponding to the head 15 after the head 15 writes data into a particular region (may also be simply referred below to as measurement of the assist-element resistance value corresponding to the head 15) is performed a particular number of times (may also be referred to as the number of resistance value measurements below). Since the assist-element resistance value may change depending on the characteristics of the head 15, the degauss adjustment unit 640 may set the degauss condition to differ for each head 15. The degauss adjustment unit 640 may set the degauss condition to be the same for a plurality of heads 15.

For example, when the assist-element resistance value corresponding to the head 15 is out of a range of Thr_upper and Thr_lower, the degauss adjustment unit 640 adjusts the degauss condition corresponding to the head 15 so that the assist-element resistance value corresponding to the head 15 is within the range of Thr_upper being the resistance upper limit value corresponding to the head 15 and Thr_lower being the resistance lower limit value corresponding to the head 15. Thr_upper indicates the upper limit (may be also referred to as a resistance upper limit value below) of the assist-element resistance value corresponding to the head 15. Thr_lower indicates the lower limit (may be also referred to as a resistance lower limit value below) of the assist-element resistance value corresponding to the head 15. When the assist-element resistance value corresponding to the head 15 is out of a range of Thr_upper indicating the upper limit (may be also referred to as a resistance upper limit value below) of the assist-element resistance value corresponding to the head 15 and Thr_lower indicating the lower limit (may be also referred to as a resistance lower limit value below) of the assist-element resistance value corresponding to the head 15, the degauss adjustment unit 640 may adjust the degauss duration corresponding to the head 15 to increase and/or adjust the degauss frequency to increase. When the assist-element resistance value corresponding to the head 15 is out of a range of Thr_upper indicating the upper limit (may be also referred to as a resistance upper limit value below) of the assist-element resistance value corresponding to the head 15 and Thr_lower indicating the lower limit (may be also referred to as a resistance lower limit value below) of the assist-element resistance value corresponding to the head 15, the degauss adjustment unit 640 may adjust the degauss duration corresponding to the head 15 to increase and/or adjust the degauss frequency to decrease. When the assist-element resistance value corresponding to the head 15 is out of a range of Thr_upper indicating the upper limit (may be also referred to as a resistance upper limit value below) of the assist-element resistance value corresponding to the head 15 and Thr_lower indicating the lower limit (may be also referred to as a resistance lower limit value below) of the assist-element resistance value corresponding to the head 15, the degauss adjustment unit 640 may adjust the degauss duration corresponding to the head 15 to decrease and/or adjust the degauss frequency to increase. When the assist-element resistance value corresponding to the head 15 is out of a range of Thr_upper indicating the upper limit (may be also referred to as a resistance upper limit value below) of the assist-element resistance value corresponding to the head 15 and Thr_lower indicating the lower limit (may be also referred to as a resistance lower limit value below) of the assist-element resistance value corresponding to the head 15, the degauss adjustment unit 640 may adjust the degauss duration corresponding to the head 15 to decrease and/or adjust the degauss frequency to decrease.

For example, when the assist-element resistance value corresponding to the head 15 is within the range of Thr_upper indicating the resistance upper limit value corresponding to the head 15 and Thr_lower indicating the resistance lower limit value corresponding to the head 15, the degauss adjustment unit 640 maintains the degauss condition corresponding to the head 15. For example, when the assist-element resistance value corresponding to the head 15 is within the range of Thr_upper indicating the resistance upper limit value corresponding to the head 15 and Thr_lower indicating the resistance lower limit value corresponding to the head 15, the degauss adjustment unit 640 may adjust the degauss condition corresponding to the head 15 so that the fluctuation in the assist-element resistance value when the measurement of the assist-element resistance value corresponding to the head 15 is performed the number of times corresponding to the number of resistance value measurements is further reduced.

For example, the degauss adjustment unit 640 sets the number of resistance value measurements for measuring the assist-element resistance value corresponding to the head 15, and sets Thr_upper indicating the resistance upper limit value of the assist-element resistance value corresponding to the head 15 and Thr_lower indicating the resistance lower limit value of the assist-element resistance value corresponding to the head 15. The degauss adjustment unit 640 initializes the number of times of writing data into a particular area of the disk 10 by the head 15 (may be referred to as the number of writes), for example, sets the number of times to 0. Then, the degauss adjustment unit repeats to write data into this region until the counter value reaches the number of resistance value measurements, while counting the number of times of writing data into the region. Each time data is written in the region by the head 15, the degauss adjustment unit 640 measures the assist-element resistance value corresponding to the head 15 after the head 15 writes data into the region, and records the measured assist-element resistance value after the write, in a particular recording region, for example, the system region 10c of the disk 10, the volatile memory 70, the non-volatile memory 80, the buffer memory 90, and the like. The degauss adjustment unit 640 calculates the average value (RSV_Ave) of the assist-element resistance value when the assist-element resistance value corresponding to the head 15 is measured the number of times corresponding to the number of resistance value measurements. The degauss adjustment unit 640 detects the minimum value (RSV_min) of the assist-element resistance value when the assist-element resistance value corresponding to the head 15 is measured the number of times corresponding to the number of resistance value measurements, and detects the maximum value (RSV_max) of the assist-element resistance value when the assist-element resistance value corresponding to the head 15 is measured the number of times corresponding to the number of resistance value measurements. "The minimum value of the assist-element resistance value when the assist-element resistance value corresponding to the head 15 is measured the number of times corresponding to the number of resistance value measurements" may also be simply referred to as "the minimum value of the assist-element resistance value" below. "The maximum value of the assist-element resistance value when the assist-element resistance value corresponding to the head 15 is measured the number of times corresponding to the number of resistance value measurements" may also be simply referred to as "the maximum value of the assist-element resistance value" below. The degauss adjustment unit 640 determines whether the minimum value of the assist-element resistance value/the average value of the assist-element resistance value<the resistance lower limit value, or the minimum value of the assist-element resistance value/the average value of the assist-element resistance value the resistance lower limit value. When the degauss adjustment unit 640 determines that the minimum value of the assist-element resistance value/the average value of the assist-element resistance value<the resistance lower limit value, the degauss adjustment unit 640 adjusts (changes) the degauss condition. The degauss adjustment unit 640 determines whether the maximum value of the assist-element resistance value/the average value of the assist-element resistance value>the resistance upper limit value, or the maximum value of the assist-element resistance value/the average value of the assist-element resistance value the resistance upper limit value. When the degauss adjustment unit 640 determines that the maximum value of the assist-element resistance value/the average value of the assist-element resistance value>the resistance upper limit value, the degauss adjustment unit 640 adjusts (changes) the degauss condition.

Figure 5:
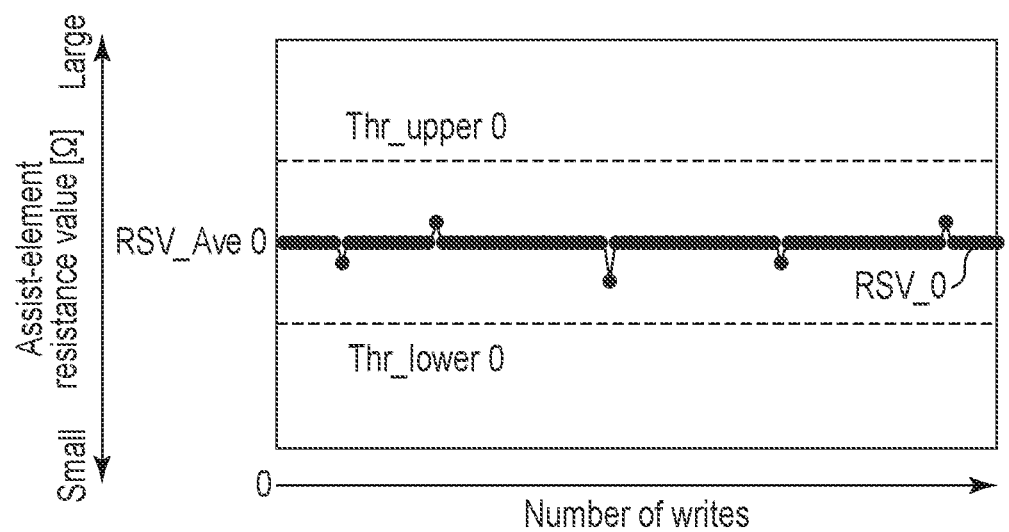
FIG. 5 is a schematic view illustrating an example of a method of adjusting a degauss condition corresponding to the head according to the embodiment.

FIG. 5 is a schematic view illustrating another example of the method of adjusting the degauss condition corresponding to the head 15-0 according to the present embodiment. In FIG. 5, a vertical axis indicates the assist-element resistance value [Ω] corresponding to the head 15-0, and a horizontal axis indicates the number of times of the head 15-0 performing writing into a particular region on the surface 1050 of the disk 10-0. On the vertical axis in FIG. 5, the assist-element resistance value increases toward the tip of a large arrow and decreases toward the tip of a small arrow. On the vertical axis in FIG. 5, the average value RSV_Ave0 of the assist-element resistance value corresponding to the head 15-0, the resistance upper limit value Thr_upper0 corresponding to the head 15-0, and the resistance lower limit value Thr_lower0 corresponding to the head 15-0 are shown. On the horizontal axis in FIG. 5, the number of writes increases toward the tip of an arrow. FIG. 5 illustrates RSV_0 being a change (may also be referred to as a change in the assist-element resistance value below) of the assist-element resistance value corresponding to the head 15-0 with respect to the number of writes. The change RSV_0 in the assist-element resistance value corresponding to the head 15-0 is within a range of the resistance upper limit value Thr_upper0 and the resistance lower limit value Thr_lower0.

In the example illustrated in FIG. 5, when the change RSV_0 in the assist-element resistance value corresponding to the head 15-0 is within the range of Thr_upper0 indicating the resistance upper limit value corresponding to the head 15-0 and Thr_lower0 indicating the resistance lower limit value corresponding to the head 15-0, the degauss adjustment unit 640 maintains the degauss condition corresponding to the head 15.

Figure 6:
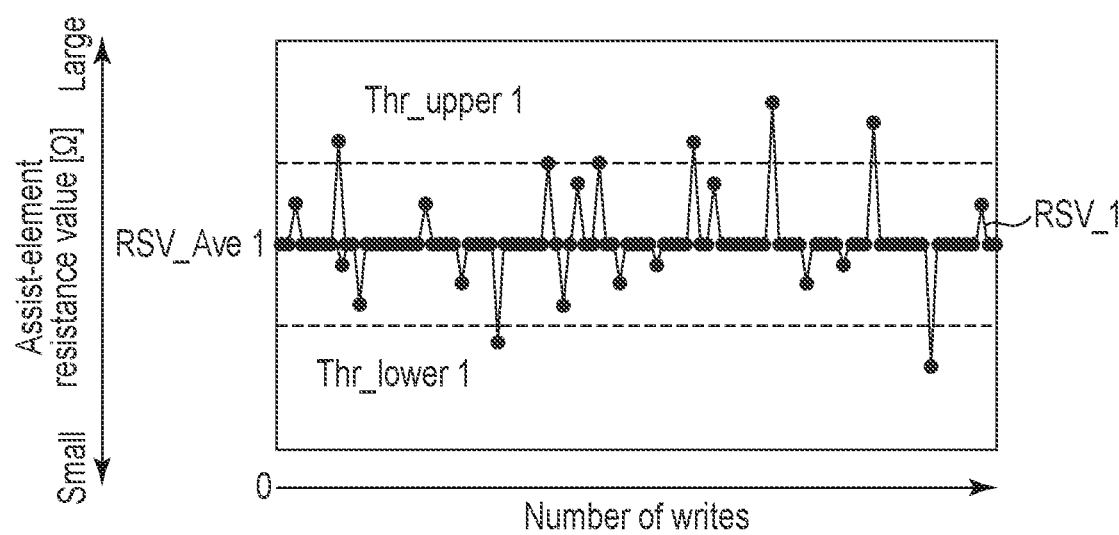
FIG. 6 is a schematic view illustrating another example of the method of adjusting the degauss condition corresponding to the head according to the embodiment.

FIG. 6 is a schematic view illustrating an example of the method of adjusting the degauss condition corresponding to the head 15-1 according to the present embodiment. In FIG. 6, a vertical axis indicates the assist-element resistance value [Ω] corresponding to the head 15-1, and a horizontal axis indicates the number of times of the head 15-1 performing writing into a particular region on the surface 10S1 of the disk 10-0. On the vertical axis in FIG. 6, the assist-element resistance value increases toward the tip of a large arrow and decreases toward the tip of a small arrow. On the vertical axis in FIG. 6, the average value RSV_Ave1 of the assist-element resistance value corresponding to the head 15-1, the resistance upper limit value Thr_upper1 corresponding to the head 15-1, and the resistance lower limit value Thr_lower1 corresponding to the head 15-1 are shown. On the horizontal axis in FIG. 6, the number of writes increases toward the tip of an arrow. FIG. 6 illustrates RSV_1 being a change (may also be referred to as a change in the assist-element resistance value below) of the assist-element resistance value corresponding to the head 15-1 with respect to the number of writes. The change RSV_1 in the assist-element resistance value corresponding to the head 15-1 is within a range of the resistance upper limit value Thr_upper1 and the resistance lower limit value Thr_lower1.

In the example illustrated in FIG. 6, when the change RSV_1 in the assist-element resistance value corresponding to the head 15-1 is out of the range of Thr_upper1 indicating the resistance upper limit value of the assist-element resistance value corresponding to the head 15-1 and Thr_lower1 indicating the resistance lower limit value of the assist-element resistance value corresponding to the head 15-1, the degauss adjustment unit 640 adjusts the degauss condition corresponding to the head 15-1 so that the change RSV 1 in the assist-element resistance value corresponding to the head 15 is within the range of Thr_upper1 indicating the resistance upper limit value of the assist-element resistance value corresponding to the head 15-1 and Thr_lower1 indicating the resistance lower limit value of the assist-element resistance value corresponding to the head 15-1.

The format setting unit 650 adjusts the data format (may be simply referred to as a format below) of the disk 10 with which the head 15 faces, in accordance with the degauss condition corresponding to the head 15. The format setting unit 650 sets the length (length of the degauss region or length of the previous Gap below) of the degauss region (or previous Gap) of the disk 10, which face the head 15, in the circumferential direction or sets the size of the degauss region, in accordance with the degauss condition corresponding to the head 15. When the different degauss condition is set for each head 15, the format setting unit 650 may set a degauss region having a different degauss region length or having a different size, for each surface 10S of the disk 10, which faces the head 15. When the different degauss condition is set for each head 15, the format setting unit 650 may set a degauss region having the same degauss region length or having the same size, for each surface 10S of the disk 10, which faces the head 15. When the same degauss condition is set for each head 15, the format setting unit 650 may set a degauss region having a different degauss region length or having a different size, for each surface 10S of the disk 10, which faces the head 15. In addition, when the same degauss condition is set for each head 15, the format setting unit 650 may set a degauss region having the same degauss region length or having the same size, for each surface 10S of the disk 10, which faces the head 15.

When the degauss condition which corresponds to the head 15 and is adjusted based on the assist-element resistance value corresponding to the head 15 is larger than the degauss condition set as the reference in the initial setting and the like (may be referred to as a reference degauss condition below), for example, the degauss duration as a reference (may be referred to as a reference degauss duration below) and the degauss frequency as a reference (may be referred to as a reference degauss frequency below), the format setting unit 650 may set the degauss region length of the degauss region of the disk 10 corresponding to the head 15 to be longer than the degauss region length or the degauss region as a reference set in the initial setting and the like in the disk 10. When the degauss condition corresponding to the head 15 is smaller than the reference degauss condition (reference degauss duration and reference degauss frequency) set based on the assist-element resistance value corresponding to the head 15 in the initial setting or the like, the format setting unit 650 may set the degauss region length of the degauss region of the disk 10 corresponding to the head 15 to be shorter than the reference degauss region length set in the initial setting and the like in the disk 10. For example, when the degauss condition corresponding to the head 15 is the same as the reference degauss condition set in the initial setting or the like, the format setting unit 650 may maintain the degauss region length of the degauss area of the disk 10 corresponding to the head 15.

Figure 7:
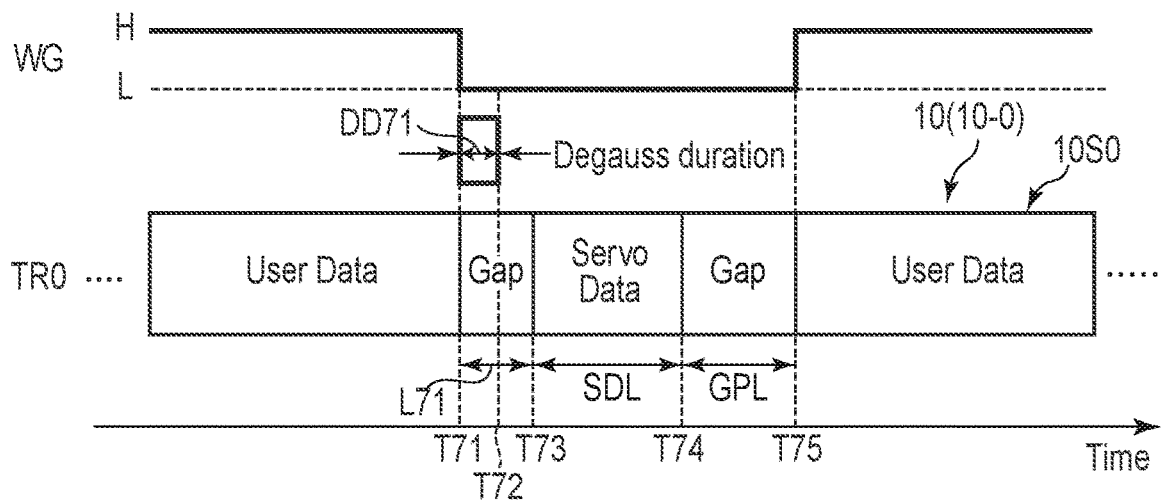
FIG. 7 is a schematic view illustrating an example of a format of a surface of the disk corresponding to the head according to the embodiment.

FIG. 7 is a schematic view illustrating an example of a format of the front surface 10S0 of the disk 10-0 corresponding to the head 15-0 according to the present embodiment. In FIG. 7, a horizontal axis indicates time. On the horizontal axis in FIG. 7, the time elapses as directing toward the tip of an arrow. The horizontal axis in FIG. 7 shows timings T71, T72, T73, T74, and T75. The timing T72 corresponds to a timing after the timing T71. The timing T73 corresponds to a timing after the timing T72. The timing T74 corresponds to a timing after the timing T73. The timing T75 corresponds to a timing after the timing T74. FIG. 7 illustrates the write gate WG and the track TR0 on the front surface 10S0 of the disk 10. In FIG. 7, the track TR0 has the previous user data, the previous Gap (degauss region), the servo data, the adjacent Gap immediately after the servo data (may also be referred to as the subsequent Gap below), and user data located after the servo data (may also be referred to as subsequent user data below). In the track TR0 of FIG. 7, the previous user data, the previous Gap (degauss region), the servo data, the subsequent Gap, and the subsequent user data are arranged in the order described. The subsequent Gap is disposed between the servo data and the subsequent user data. FIG. 7 illustrates the length (degauss region length) L71 of the previous Gap, the length (may also be referred to as the length of the servo data below) SDL of the servo data in the circumferential direction, and the length (may also be referred to as the length of the subsequent Gap below) GPL of the subsequent Gap in the circumferential direction. The length (degauss region length) L71 of the previous Gap corresponds to the length in the circumferential direction, from the circumferential position corresponding to the timing T71 to the circumferential position corresponding to the timing T73. The length SDL of the servo data corresponds to the length in the circumferential direction, from the circumferential position corresponding to the timing T73 to the circumferential position corresponding to the timing T74. The length GPL of the subsequent Gap corresponds to the length in the circumferential direction, from the circumferential position corresponding to the timing T74 to the circumferential position corresponding to the timing T75. For example, the length L71 of the previous Gap is smaller than the reference degauss region length. FIG. 7 illustrates a degauss duration DD71 adjusted based on the change RSV 0 of the assist resistance value illustrated in FIG. 5. The degauss duration DD71 corresponds to the period from the timing T71 to the timing T72. For example, the degauss duration DD71 is shorter than the reference degauss duration.

In the example illustrated in FIG. 7, when the format setting unit 650 determines that the degauss duration DD71 adjusted based on the change RSV 0 of the assist resistance value illustrated in FIG. 5 is shorter than the reference degauss duration, the format setting unit sets the length of the previous Gap to be the degauss region length L71 which is shorter than the reference degauss length.

The read/write controller 610 negates the write gate WG at the circumferential position in the previous Gap, which corresponds to the timing T71, so as to stop the write process. In the degauss operation in accordance with the degauss duration DD71, the read/write controller 610 writes data corresponding to the residual magnetization of the head 15-0 in a range in the previous Gap from the circumferential position in the previous Gap corresponding to the timing T71 to the circumferential position in the previous Gap corresponding to the timing T72. The read/write controller 610 reads the servo data from the circumferential position in the servo data corresponding to the timing T73 to the circumferential position in the servo data corresponding to the timing T74. The read/write controller 610 asserts the write gate WG at the circumferential position in the subsequent user data corresponding to the timing T75 so as to start (restart) the write process.

Figure 8:
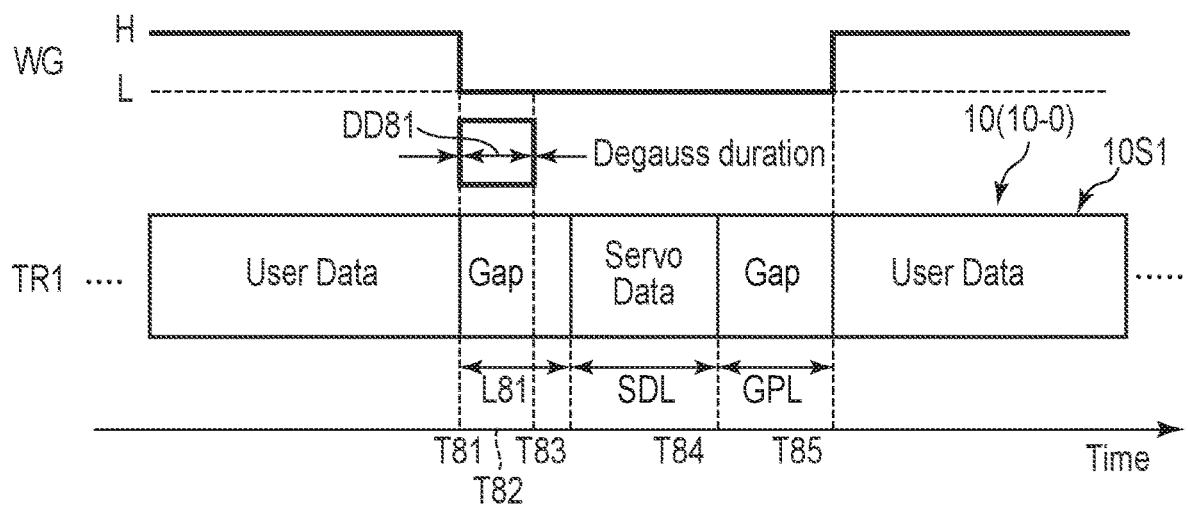
FIG. 8 is a schematic view illustrating an example of a format of a back surface of the disk corresponding to the head according to the embodiment.

FIG. 8 is a schematic view illustrating an example of a format of the back surface 10S1 of the disk 10-0 corresponding to the head 15-1 according to the present embodiment. In FIG. 8, a horizontal axis indicates time. On the horizontal axis in FIG. 8, the time elapses as directing toward the tip of an arrow. The horizontal axis in FIG. 8 shows timings T81, T82, T83, T84, and T85. The timing T82 corresponds to a timing after the timing T81. The timing T83 corresponds to a timing after the timing T82. The timing T84 corresponds to a timing after the timing T83. The timing T85 corresponds to a timing after the timing T84. FIG. 8 illustrates the write gate WG and the track TR1 on the back surface 10S1 of the disk 10. In FIG. 8, the track TR1 has the previous user data, the previous Gap (degauss region), servo data, the subsequent Gap, and the subsequent user data. In the track TR1 of FIG. 8, the previous user data, the previous Gap (degauss region), the servo data, the subsequent Gap, and the subsequent user data are arranged in the order described. FIG. 8 illustrates the length (degauss region length) L81 of the previous Gap, the length SDL of the servo data, and the length GPL of the subsequent Gap. The length (degauss region length) L81 of the previous Gap corresponds to the length in the circumferential direction, from the circumferential position corresponding to the timing T81 to the circumferential position corresponding to the timing T83. The length SDL of the servo data corresponds to the length in the circumferential direction, from the circumferential position corresponding to the timing T83 to the circumferential position corresponding to the timing T84. The length GPL of the subsequent Gap corresponds to the length in the circumferential direction, from the circumferential position corresponding to the timing T84 to the circumferential position corresponding to the timing T85. For example, the length L81 of the previous Gap is longer than the length L71 of the previous Gap illustrated in FIG. 7. For example, the length L81 of the previous Gap is longer than the reference degauss region length. FIG. 8 illustrates a degauss duration DD81 adjusted based on the change RSV 1 of the assist resistance value illustrated in FIG. 6. The degauss duration DD81 corresponds to the period from the timing T81 to the timing T82. For example, the degauss duration DD81 is longer than the degauss duration DD71 illustrated in FIG. 7. For example, the degauss duration DD81 is shorter than the reference degauss duration.

In the example illustrated in FIG. 8, when the format setting unit 650 determines that the degauss duration DD81 adjusted based on the change RSV 1 of the assist resistance value illustrated in FIG. 6 is longer than the reference degauss duration, the format setting unit sets the length of the previous Gap to be the degauss region length L81 which is longer than the reference degauss length.

The read/write controller 610 negates the write gate WG at the circumferential position in the previous Gap, which corresponds to the timing T81, so as to stop the write process. In the degauss operation in accordance with the degauss duration DD81, the read/write controller 610 writes data corresponding to the residual magnetization of the head 15-1 in a range in the previous Gap from the circumferential position in the previous Gap corresponding to the timing T81 to the circumferential position in the previous Gap corresponding to the timing T82. The read/write controller 610 reads the servo data from the circumferential position in the servo data corresponding to the timing T83 to the circumferential position in the servo data corresponding to the timing T84. The read/write controller 610 asserts the write gate WG at the circumferential position in the subsequent user data corresponding to the timing T85 so as to start (restart) the write process.

Figure 9:
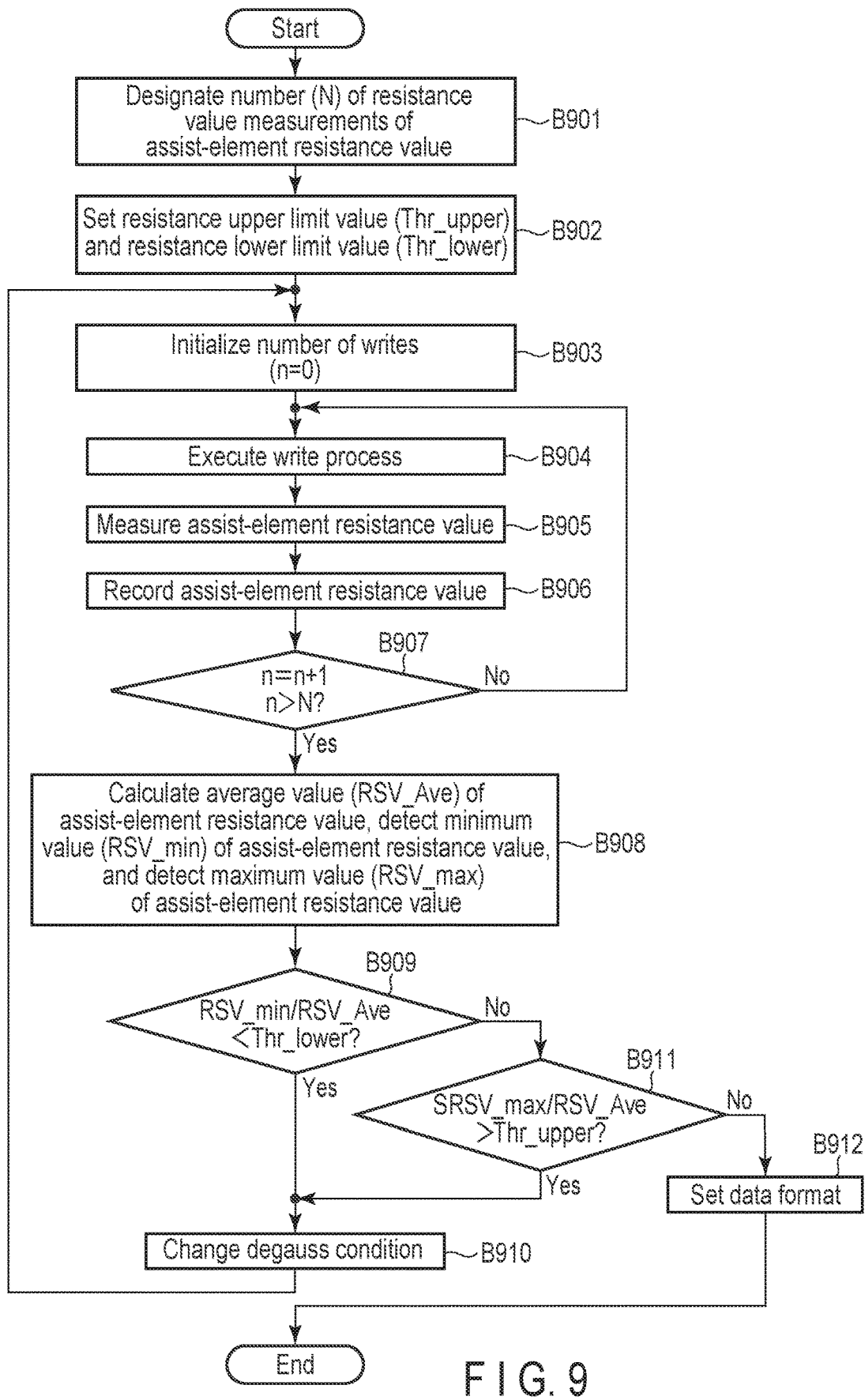
FIG. 9 is a flowchart illustrating an example of a method of setting a data format according to the embodiment.

FIG. 9 is a flowchart illustrating an example of the method of setting the data format according to the present embodiment.

The MPU 60 sets the number (N) of resistance value measurements for measuring the assist-element resistance value corresponding to the head 15 (B901). The MPU 60 sets Thr_upper indicating the resistance upper limit value of the assist-element resistance value corresponding to the head 15 and Thr_lower indicating the resistance lower limit value of the assist-element resistance value corresponding to the head 15 (B902). The MPU 60 initializes the number of times of the head 15 performing writing into a particular region of the disk 10 (n=0) (B903), and executes the write process in this region (B904). After executing the write process in this region, the MPU 60 measures the assist-element resistance value corresponding to the head 15 (B905). The MPU 60 sets the measured assist-element resistance value corresponding to the head 15, in a particular recording region, for example, the system region 10c of the disk 10, the volatile memory 70, the non-volatile memory 80, the buffer memory 90, and the like (B906). The MPU 60 adds 1 to the number of writes (n) and then determines whether the number of writes (n) is more than the number (N) of resistance value measurements or the number of writes (n) is equal to or less than the number (N) of resistance value measurements (B907). When the MPU determines that the number of writes (n) is equal to or less than the number (N) of resistance value measurements (NO in B907), the MPU 60 proceeds to the process of B904. When the MPU determines that the number of writes (n) is more than the number (N) of resistance value measurements (YES in B907), the MPU 60 calculates the average value (RSV_Ave) of the assist-element resistance value when the assist-element resistance value corresponding to the head 15 is measured the number of times corresponding to the number of resistance value measurements. The MPU detects the minimum value (RSV_min) of the assist-element resistance value when the assist-element resistance value corresponding to the head 15 is measured the number of times corresponding to the number of resistance value measurements. Then, the MPU detects the maximum value (RSV_max) of the assist-element resistance value when the assist-element resistance value corresponding to the head 15 is measured the number of times corresponding to the number of resistance value measurements (B908).

The MPU 60 determines whether RSV_min/RSV_Ave<Thr_lower or RSV_min/RSV_Ave≥Thr_lower (B909). When the MPU determines that RSV_min/RSV_Ave<Thr_lower (Yes in B909), the MPU 60 changes the degauss condition (B910) and proceeds to the process of B903. For example, the MPU 60 changes the degauss condition so that RSV_min/RSV_Ave≥Thr_lower and/or RSV_max/RSV_Ave≤Thr_upper.

When the MPU determines that RSV_min/RSV_Ave≥Thr_lower (No in B909), the MPU 60 determines whether RSV_max/RSV_Ave>Thr_upper or RSV_max/RSV_Ave≤Thr_upper (B911). When the MPU determines that RSV_max/RSV_Ave>Thr_upper (Yes in B911), the MPU 60 proceeds to the process of B910. When the MPU determines that RSV_max/RSV_Ave≤Thr_upper (No in B911), the MPU 60 sets the data format of the disk 10 with which the head 15 faces, in accordance with the degauss condition corresponding to the head 15 (B912). Then, the MPU ends the processing. For example, the MPU 60 adjusts the degauss region length of the degauss region in a particular track of the disk 10, with which the head 15 faces, in accordance with the degauss condition corresponding to the head 15.

According to the present embodiment, the magnetic disk device 1 adjusts the degauss condition corresponding to the head 15 so that the fluctuation of the assist-element resistance value when the assist-element resistance value corresponding to the head 15 is measured the number of times corresponding to the number of resistance value measurements is reduced. For example, the magnetic disk device 1 adjusts the degauss region length of the degauss region in a particular track on the surface 10S of the disk 10 with which the head 15 faces, in accordance with the adjusted degauss condition. The magnetic disk device 1 can expand the user data region of the disk 10 while avoiding pole erase of erasing data, for example, servo data by the residual magnetization generated in the write head 15W (main magnetic pole 171 and write shield 172) after stopping the write process by adjusting the degauss region as described above. Therefore, the magnetic disk device 1 can improve the format efficiency.

In the above-described embodiment, the magnetic disk device of the high frequency (microwave) assisted magnetic recording type (MAMR) is described. The above-described embodiment can be applied to the magnetic disk device of the thermally assisted magnetic recording (TAMR) type when there is a part at which the resistance value can be measured at the position affected by the recording magnetic field.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   a head including a read head that reads data from the disk, a write head that writes data into the disk, and an assist element that generates energy for improving write performance of the write head; and
   a controller that adjusts a degauss condition after a stop of a write process of the write head, based on a resistance value of the assist element, and adjusts a data format of the disk in accordance with the degauss condition, the resistance value being measured after data is written into the disk, and the write process having an influence on the resistance value.

2. The magnetic disk device according to claim 1, wherein the degauss condition includes a degauss duration from when the write process of the write head is stopped until magnetization of the write head disappears, and a degauss frequency of a recording current to be supplied to the write head after the write head stops the write process.

3. The magnetic disk device according to claim 1, wherein the controller adjusts the degauss condition so that the resistance value does not fluctuate in a first measurement of the resistance value.

4. The magnetic disk device according to claim 3, wherein when the resistance value in the first measurement of the resistance value is more than a first upper limit value or less than a first lower limit value, the controller adjusts the degauss condition so that the resistance value is within a range of the first upper limit value and the first lower limit value.

5. The magnetic disk device according to claim 2, wherein the controller adjusts the data format in accordance with the degauss duration.

6. The magnetic disk device according to claim 5, wherein when the degauss duration is shorter than a first period, the controller reduces a first region disposed between user data and servo data of the disk.

7. The magnetic disk device according to claim 1, wherein the assist element is a spin torque oscillator.

8. A magnetic disk device comprising:
   a first disk including a first surface having first user data, first servo data, and a first region between the first user data and the first servo data;
   a second disk including a second surface having second user data, second servo data, and a second region that is provided between the second user data and the second servo data and has a size different from a size of the first region;
   a first head including a first read head that reads data from the first surface, a first write head that writes data into the first surface, and a first assist element that generates energy for improving write performance of the first write head;
   a second head including a second read head that reads data from the second surface, a second write head that writes data into the second surface, and a second assist element that generates energy for improving write performance of the second write head; and a controller that sets a second degauss condition after a stop of a write process of the second write head, the second degauss condition being different from a first degauss condition after a stop of the write process of the first write head.

9. The magnetic disk device according to claim 8, wherein the controller adjusts the first degauss condition based on a first resistance value of the first assist element, which is measured after data is written into the first disk, adjusts a first data format of the first disk in accordance with the first degauss condition, adjusts the second degauss condition based on a second resistance value of the second assist element, which is measured after data is written in the second disk, and adjusts a second data format of the second disk in accordance with the second degauss condition.

10. The magnetic disk device according to claim 9, wherein
the first degauss condition includes a first degauss duration from when the first write head stops the write process until magnetization of the first write head disappears, and a first degauss frequency of a recording current to be supplied to the first write head after the write process of the first write head is stopped, and
the second degauss condition includes a second degauss duration from when the second write head stops the write process until magnetization of the second write head disappears, and a second degauss frequency of a recording current to be supplied to the second write head after the write process of the second write head is stopped.

11. The magnetic disk device according to claim 10, wherein the controller adjusts the first degauss condition so that the first resistance value does not fluctuate in a first measurement of the first resistance value, and adjusts the second degauss condition so that the second resistance value does not fluctuate in a second measurement of the second resistance value.

12. The magnetic disk device according to claim 11, wherein the controller adjusts the first degauss condition so that the first resistance value is within a range of a first upper limit value and a first lower limit value, when the first resistance value in the first measurement of the first resistance value is more than the first upper limit value or less than the first lower limit value, and adjusts the second degauss condition so that the second resistance value is within a range of a second upper limit value and a second lower limit value, when the second resistance value in the second measurement of the second resistance value is more than the second upper limit value or less than the second lower limit value.

13. The magnetic disk device according to claim 10, wherein the controller adjusts the first data format in accordance with the first degauss duration, and adjusts the second data format in accordance with the second degauss duration.

14. A method of setting a data format, which is applied to a magnetic disk device including a disk, and a head including a read head that reads data from the disk, a write head that writes data into the disk, and an assist element that generates energy for improving write performance of the write head, the method comprising:
adjusting a degauss condition after a stop of a write process of the write head, based on a resistance value of the assist element, the resistance value being measured after data is written into the disk, and the write process having an influence on the resistance value; and
adjusting a data format of the disk in accordance with the degauss condition.

15. The method of setting a data format according to claim 14, wherein the degauss condition includes a degauss duration from when the write process of the write head is stopped until magnetization of the write head disappears, and a degauss frequency of a recording current to be supplied to the write head after the write head stops the write process.

16. The method of setting a data format according to claim 14, wherein the degauss condition is adjusted so that the resistance value does not fluctuate in a first measurement of the resistance value.

17. The method of setting a data format according to claim 16, wherein when the resistance value in the first measurement of the resistance value is more than a first upper limit value or less than a first lower limit value, the degauss condition is adjusted so that the resistance value is within a range of the first upper limit value and the first lower limit value.

18. The method of setting a data format according to claim 15, wherein the data format is adjusted in accordance with the degauss duration.

19. The method of setting a data format according to claim 18, wherein when the degauss duration is shorter than a first period, a first region disposed between user data and servo data of the disk is reduced.

20. The method of setting a data format according to claim 14, wherein the assist element is a spin torque oscillator.

* * * * *